United States Patent
Stuth

(10) Patent No.: US 7,950,124 B2
(45) Date of Patent: May 31, 2011

(54) METHOD FOR PRODUCING METAL STRIPS

(76) Inventor: Theodor Stuth, Neuss (DE)

( * ) Notice: Subject to any disclaimer, the term of this patent is extended or adjusted under 35 U.S.C. 154(b) by 1083 days.

(21) Appl. No.: 11/661,782

(22) PCT Filed: Sep. 1, 2005

(86) PCT No.: PCT/EP2005/009414
§ 371 (c)(1),
(2), (4) Date: Mar. 2, 2007

(87) PCT Pub. No.: WO2006/024526
PCT Pub. Date: Mar. 9, 2006

(65) Prior Publication Data
US 2007/0262123 A1    Nov. 15, 2007

(30) Foreign Application Priority Data
Sep. 2, 2004 (DE) .................... 10 2004 042 481

(51) Int. Cl.
*B23P 17/00* (2006.01)
*B23K 28/00* (2006.01)
(52) U.S. Cl. .......................... 29/417; 228/176
(58) Field of Classification Search .................. 29/417, 29/428, 525.14, 527.7, 412; 228/176, 158
See application file for complete search history.

(56) References Cited

U.S. PATENT DOCUMENTS

| | | | |
|---|---|---|---|
| 2,569,368 A | 1/1946 | Bradner | |
| 3,380,277 A | 4/1968 | Mulflur | |
| 3,722,073 A | 3/1973 | Larson | |
| 6,143,241 A * | 11/2000 | Hajaligol et al. | ............... 419/31 |

FOREIGN PATENT DOCUMENTS

| | | | |
|---|---|---|---|
| DE | 1948682 | * | 4/1971 |
| DE | 29 05 508 | | 8/1980 |
| DE | 100 05 861 | | 10/2000 |
| EP | 1 327 487 | | 7/2003 |
| GB | 27 147 | | 11/1912 |
| GB | 455 360 | | 10/1936 |
| JP | 5 819 2607 | | 10/1983 |
| JP | 5 910 5264 | | 6/1984 |
| JP | 6 019 4032 | | 2/1985 |
| JP | 0 407 2036 | | 6/1992 |

OTHER PUBLICATIONS

ARC Welding of Nickel Alloys, p. 436-445, S.D.Kiser,Products Manager, Welding Products Co.
Automatisation De La Ligne De Decapage . . . , p. 861-871, G.Keintzel et al.
Deutsches Worterbuch, Gerhard Wahrig, pp. 228-229.

* cited by examiner

*Primary Examiner* — John C Hong
(74) *Attorney, Agent, or Firm* — Andrew Wilford

(57) ABSTRACT

The invention relates to a method for joining cathode metal sheets to form crude strips that can be coiled and rolled and for the production of metal strips of a constant thickness from crude strips that have been produced from cathode metal sheets of varying thicknesses. The aim of the invention is to produce metal strips of a high purity that are devoid of non-metallic inclusions. The method can be used whenever highly pure and/or inclusion-free metal in strip or foil form is required in large quantities. The application of said method is only limited by the fact that the metal is deposited electro-lytically on cathodes, and if permanent cathodes are used, must be separated from said cathodes without fragmentation. This is possible with the following metals: lead, zinc, tin, copper, nickel, cobalt, cadmium, iron and gold.

16 Claims, No Drawings

METHOD FOR PRODUCING METAL STRIPS

CROSS REFERENCE TO RELATED APPLICATIONS

This application is the US national phase of PCT application PCT/EP2005/009414, filed 1 Sep. 2005, published 9 Mar. 2006 as WO 2006/024526, and claiming the priority of German patent application 102004042481.0 itself filed 2 Sep. 2004.

A. FIELD OF THE INVENTION

The invention relates to a method of making metal strips by joining electrolytically produced cathode sheets, particularly to form raw strips that can be coiled and rolled and for producing metal strips of constant thicknesses as well as raw strips obtained from cathode sheets of different thicknesses. Furthermore, the invention relates to a method for pretreating cathode sheets.

The term strips describes flat, longitudinally stretched metal bodies that may have significant widths (up to more than 1 m). The term "strips" as used herein describes strips in the sense established for metal strips (e.g. "hot strip" or "cold strip").

B. BACKGROUND OF THE INVENTION

The following one-element metals may be, among others, produced as cathode sheets by means of aqueous electrolysis.

| metal | cathode sheet or flakes? | permanent cathode or starter sheet? | material of the cathode sheet |
|---|---|---|---|
| chrome | C/F | P | S |
| manganese | C/F | P | S |
| iron | C | P | S |
| cobalt | C | P/SS | S |
| nickel | C | SS | — |
| copper | C | P/SS | S |
| zinc | C | P | A |
| cadmium | C | P | S |
| tin | C | P | S |
| lead | C | SS | — |

Explanations:
C = cathode sheet
F = flakes
P = permanent cathode
SS = starter sheet
A = aluminum
S = stainless steel By means of electrolysis, not only deposition from an element can be produced, but, by means of codeposition, alloys as well. It is known in the state of the art that metal in highly pure form is produced due to the deposition by electrolysis. The term "highly pure" describes the absence of any undesirable components. The metal depositions produced are practically free of undesirable metallic and nonmetallic inclusions.

Cathode sheets can be used to produce strips having a purity level that cannot be achieved by metal smelting, not even with large technical efforts: Certain impurities (e.g. selenium as far as the production of nickel is concerned) cannot be eliminated by open melting. The open melting process is associated with gas absorption during the melting process and formation of oxides. Impurities can only be eliminated and oxide formation can only be avoided by vacuum melting. Ingots produced by metal smelting, e.g. from nickel, however, are coarse-grained and interspersed with segregations; therefore, they have to be remelted.

In the production of strips by metal smelting, nonmetallic inclusions may be created in several production stages, e.g. in the melting stage, due to oxidation products that were not transferred to the slag, wall ruptures from the converter and when the melt is cast by entrained slag from the casting spout. Without using special installations (e.g. for remelting electroslag), strips with few inclusions can only be produced when the work is carried out with continuous and extreme care in all production stages. Even then, inclusions may occur that might become visible only in later processing stages, particularly during cold rolling and deep drawing, unless they are detected by special sensors. Cathode sheets, on the other hand, can be produced practically without any inclusions being formed. The deposition of nonmetallic particles on the cathode can be avoided by simple measures, such as filtration of the electrolyte, covering of anodes and cathodes with bags or application of the divided cell technology.

It is known that single cathode sheets can be rolled.

I. Production of Strips from Sheets of Identical Thickness or from Sheet Strips of Identical Thicknesses Cut from a Single Sheet.

Strips have been produced from sheets for at least 100 years. At that time, the state of the art of production technology did not allow for a direct production of strips of great length, since for that purpose hot rolling trains with several stands are required in the hot forming stage, which have been employed only since ca. 1925. Until then, overlapping sheets for the production of strips were at first riveted, later overlapping sheets were welded and finally staples of sheets were welded (U.S. Pat. No. 1,131,037) and the seam was forged (GB 727,985).

Since strips made of sheets of different thicknesses are not usable, in all of the above mentioned cases sheets of the same thickness were used. The sheets to be joined were produced as single rolled sheets by rolling thereby guaranteeing that the sheets to be joined were of the same thicknesses.

For production reasons, however, the thickness of cathode sheets differs strongly. Depending on metal and manufacturer, the thickness differences amount to between 50% and 150% of the minimal thickness (c.f. D.III below).

It was proposed (DE 2905508) to cut a sheet into strips and to join the strips of constant thicknesses thus obtained. Since the strip thus obtained is produced from one single plate, the thickness variations are quite limited. The problem of different thicknesses of the cathode sheets is thus avoided, the greater lengths, however, are traded off against the width of the strips.

The starting point of CH 64287 for which DE 2905506 is claimed as priority is the ostensibly "unfavorable form of the raw material" of cathode sheets. The plate form is to be brought into the form of a rod in a "cold" procedure, since the plate form is not supposed to be suited for direct transformation into longitudinally stretched shapes. The latter is, however, precisely the object of the method according to the invention. According to the claims of CH 642874, whole plates are also to be welded together, cut and subsequently rolled. The problems resulting from welding, coiling and rolling, in particular the handling of the different thicknesses of the cathode sheets, are not even mentioned, let alone solved.

Indeed, according to the state of the art, thickness variations between different sheets joined to form one strip cannot be controlled in rolling procedures. Therefore, strips made of cathode sheets are only available in dimensions that can be produced from one single plate.

II. Joining of Electrolytically Produced Strips and Sheets of Identical Thickness 1. Electrolytic Joining Method The joining of electrolytically produced strips is already known. U.S. Pat. No. 2,569,368 describes an electrolytic joining method for electrolytically produced, narrow and thin strips. The method is particularly recommended for the production of endless strips. First, the ends to be connected are bent. After fixation of the sheets, the ends serve as side walls of an electrolytic cell. Not only is the cavity formed by the bending electrolytically filled with metal, but also a certain upward projection is created. Subsequent to the removal of the strip from the cell, the upward projection and the material deposited in the former depression with the sheet ends delimiting the depression are ground such that they reach the level of the strips. The method is advantageous since sheet and joining seam approximately have the same composition, due to the fact that the joining seam is produced in the same way as the sheets to be joined. In addition, the joining procedure is carried out in cold manner so that problems associated with welding processes can be avoided.

The method should is only to be used for joining thin strips; that is it is only justifiable from an economic point of view as far as the joining of thin bands is concerned. The material to be deposited is always several times thicker than the original strips, since a cavity to be filled with electrolytically deposited material has to be generated. In order to allow for bending of sheets having a thickness from 4 to 6 mm, i.e. the minimal thickness of cathode sheets, a certain bending radius is required and a part of a length of several cm has to be fixed in the bending machine in order that the sheet is not pulled out of the blank-holder during bending. Therefore, the ends of the sheets have to be shortened subsequently to folding, so as to avoid too large a cavity. The electrolytic composition of layers is a very slow process; the deposition of cathode sheets takes at least one week (nickel: 5-10 days when deposited on starter sheets, the generation of which required 1.5 to 3 days; copper: about 10 to 14 days if starter sheets are used; 5 to 14 days if permanent cathodes are used. Even more time is required for filling a cavity with a cross section exceeding the thickness of the sheets to be joined.

Strips made of thick sheets cannot be produced for reasons of time and the resulting financial efforts, particularly if the method is applied sequentially.

2. Joining by Welding

DE 2905508 and CH 642974 propose the joining of cathode sheets made of nickel by welding, in particular by butt welding or using highly pure nickel welding electrodes.

For "rods" produced from cathode sheets by cleaving, the method of choice may be flash butt welding, which is, however, not recommended for whole cathode sheets. In fact also hot strips of production width are joined by butt welding, but nickel, in particular electrolytically produced nickel is significantly harder and thus, correspondingly higher compression forces have to be applied. Therefore, commercially available flash butt welding devices are not capable of joining nickel sheets in the form of entire cathodes.

It has been proposed to carry out the welding with electrodes made of pure nickel so that the purity level of the weld seams is not reduced. To this end the electrodes are not coated. In the case of manual light arc welding, however, the coating has an irreplaceable function: by formation of a slag film, the melt is isolated from the air; by disintegration it forms an inert-gas barrier consisting of $CO$, $CO_2$ and $H_2$. Welding experiments with electrodes of pure nickel showed that a strongly porous weld seam interspersed with holes is generated. The seam is sufficient to join the sheets but the strip cannot be rolled with high front-to-back tension, since it would break at the welded joint. High front-to-back tension, however, is necessary in rolling procedures, since given the thickness variations of the cathode sheets, without tension the thick sheets that have to be more strongly reduced would become broader than thinner sheets. This is undesirable since an irregular lateral expansion only leads to waste and results in an unbalanced coil during rolling.

DE 2905508 requires a thermal structure treatment of the welded joints in order that a continuous soft material can be made. Cutting a sheet leads to a strong deformation at the cutting edge with effects on the sheet, while the adjoining sheet parts are only slightly deformed. The sheet parts are situated in the heat-affected zone during welding. For this reason and because of the high temperatures reached during welding, a coarse grain is formed there. The demand for a thermal structure treatment shows that a welding procedure of low energy density has been used. The lower the energy density of the welding procedure, the broader the heat affected zone and the more significant the structure modifications. Anyway, for different reasons, such welding procedures are not suited for the object to be solved as will be explained in detail further below.

With the state of the art represented by DE 2905508 and CH 642874, cathode sheets cannot be joined by welding without causing the formation of holes and pores.

C. OBJECT OF THE INVENTION

The object of this invention is to provide a method by means of which strips, particularly strips of constant thickness, can be made from cathode sheets; and to simultaneously maintain the purity level of metals achieved by means of aqueous electrolysis and inclusion-free processing. Moreover, the object consists in the development of a method by means of which single plates can be joined together such that few pores and no holes are generated, in order that the joint is strong enough to allow for the joined sheets to tolerate high tensile forces that occur when rolling is performed under high tensions;

reducing the sulfur content in the cathode sheets if the sulfur content otherwise reaches such levels that the cathode sheets cannot be folded during coiling without embrittling;

providing for easier rollability of the cathode sheets;

developing a leveling method by means of which the different thicknesses of the joined sheets can be adjusted to each other;

eliminating planarity defects of cathode sheets obtained from starter sheets;

compensating for the differences in grain sizes resulting from different reductions of the joined sheets by welding the sheets.

SUMMARY OF THE INVENTION

By means of the inventive method sheets are to be joined by seams without holes and with only few pores to form raw strips that can be coiled and rolled, and particularly sheets of different thicknesses are to be processed into strips of constant thickness.

For the production of strips, it is therefore proposed to degas and desulfurise and to transform the crystal structure of electrolytically produced smelted products in the form of cathode sheets, if required, and to join the sheets by welding as well as to eliminate thickness variations of the starting material by a special rolling or rolling method. The irregular structure caused by joining the sheets and maybe by the different degrees of reduction is transformed into a regular structure by means of a method depending on the kind of metal used. Thanks to the inventive method the purity and absence of inclusions of an electrolytically produced intermediate product of metal is not compromised during processing.

The strips produced according to the invention can be advantageously used wherever strips of high purity and/or with no inclusions are needed.

The expression "whole" cathode sheets refers to sheets, the longitudinal and transverse dimensions of which, subsequent to electrodeposition, are reduced by trimming; that is sheets essentially maintaining their original dimensions after production and not having been reduced.

I. Joining Technique for Cathode Sheets

The joint between the cathode sheets has to be free of holes and almost completely free of pores for several reasons; thus, it is not sufficient to just join the sheets by means of the applied joining technique.

The weld seams become a part of the completed strip. A weld seam in a beveled 5 mm thick TIG-welded sheet is about 10 mm wide. If the strip is reduced to 0.1 mm the weld seam is 50 cm wide. Once the strip has been finished, the section of a rolled weld seam must not be distinguishable from the rolled cathode sheet.

Rolling does not close holes; it would be impossible to market a holey strip. In the method proposed, strong reel tensions are used for rolling; therefore, in processing, pores and holes are predetermined break points causing tearing of the strips. Tears of the strip lead to serious damage of the rolls and to machine down time. The risk of strip tears must not be higher in a strip derived from cathode sheets than in hot strips to be cold rolled, otherwise no rolling mill will be willing to roll the strip.

Moreover, the strip has to be free of pores since the oxidizing components in included gases oxidize the walls of the pores. While pores containing reducing gases (e.g. $H_2$) can be fused after degassing by rolling, oxidized pore walls cannot be fused by rolling, even hot rolling, unless the degree of reduction reaches such a high level that the oxide layers that are harder, i.e. less deformable than the basic material, break under the applied deformation degree so that blank material can be welded. For the purpose, degrees of reduction of >60% in a reduction stage are required that can only be obtained with cold rolling mills of special construction (Sendzimir). In any case, the oxides remain in the basic material in the form of hard, nonmetallic inclusions, compromising for example the deep-drawing characteristics. In case of strong reduction of the strip, oxidized pores lead to efflorescences on the surface; if they are enclosed in the material, they have negative influences on the hardness due to their stress concentration.

Thus, the success of the method to be developed depends on impeccable weld seams.

II. Avoiding Cold Brittleness

Sulfur compounds deposited on the grain boundaries lead to cold brittleness in cold forming. If the joined cathode sheets are wound on coils, cold brittleness would lead to surface tears that cannot be closed.

III. Modifications of the Crystal Structure

More often than not cathode sheets have a fine-grained, fibrous or columnar structure perpendicular to the sheet plane. Therefore, they are particularly hard to deform. Therefore, the sheets should be modified such that the rolling procedure is facilitated.

IV. Reduction of Thickness Variations of Cathode Sheets

In industrial dimensions, cathode sheets are produced in installations of the size of a football field; the sheets have a thickness varying by several mm, due to the different depth of electrolyte fluid, the change in the concentration of metal ions while flowing through the installation, the time difference regarding the application of the cathode substrates and the differences of the electrical tension effective at each cathode.

Dimensions of Cathode Sheets

| material | producer | width mm | length mm | thickness mm | thickness variation in % | weight kg |
| --- | --- | --- | --- | --- | --- | --- |
| copper | Montanwerke Brixlegg AG | 1000 | 1000 | 5-10 | 100 | 45-60 |
| | Gtogów I | 880 | 880 | 10-25 | 150 | 80-130 |
| | Gtogów II | 1030 | 1030 | 10-25 | 150 | 80-130 |
| | Legnica | 910 | 780 | 10-20 | 100 | 95 |
| nickel | Norilsk nickel | 855 | 1055 | 4-6 | 50 | 15-40 |

During production, little attention is paid to the dimensional accuracy of the sheets generated by electrolysis. This is due to the fact that up to now cathode sheets were processed, at the most, in the form of single sheets; the by far exceeding percentage is fused or processed into squares.

V. Correction of Planarity Defects

When cathode substrates are used, the electrolytically deposited metal is deposited in the form of plates. The cathode substrates onto which the metal is deposited are either so-called starter sheets or permanent cathodes. The metals depositing on permanent cathodes are peeled off the cathode substrate; subsequently, the cathode substrates are used again. Permanent cathodes are comparatively thick and distort only slightly if they distort at all. Thus, the sheets produced by the technique are planar.

Starter sheets are electrolytically produced thin foils. For cost reasons, the starter sheets are kept as thin as possible; thus, they are easily distorted and deformed. Furthermore, starter sheets do not lie flat, but are slightly wavy in the electrolysis bath. Since the starter sheets grow into the generated cathode sheets, the cathode sheets generated thereby are also slightly wavy. The deviations regarding dimensions and form are tolerated by the customers since at present the shape of the cathode sheets plays no role at all in further applications. Most of the time, the sheets are cut and sold as "cut cathodes" in barrels as packaging units.

If strips are made from cathode sheets that again were produced using sheets, the lack of flatness of the sheets has to be corrected.

VI. Generation of Identical Grain Sizes

A strip produced from cathode sheets of different thicknesses by welding inevitably has different grain sizes as a result of
- structural modifications due to heat when the sheets are joined by welding,
- different deformations since the thicknesses of the single sheets have to be adjusted to each other.

A strip with different grain sizes reacts differently to the same treatment conditions when processed. Therefore it cannot be processed in a process-safe way. Hence such a strip probably cannot be sold. Therefore, it has to be ensured that after several rolling and annealing steps no differences resulting from the originally different grain size of the sheets can be observed.

D. SPECIFIC DESCRIPTION

According to the invention it is proposed to produce strips directly from cathode sheets, i.e. without the intermediate melting stage. The strips that can be produced by means of the method are limited in their width and thickness by the dimensions of the original material.

I. Welding

In order to produce a strip, the cathode sheets have to be joined by welding. The following requirements have to be fulfilled by the welding procedure:

- the weld seam is supposed to have little pores and no holes;
- welding additives generally must not reduce the purity level of the sheets;
- it has to be possible to join sheets of different thicknesses;
- the weld seam has to have good tensile strength and satisfactory ductility;
- if required, it has to be possible for the weld seam to be treated such that the strip can be rolled subsequently to the welding procedure.

1. Production of Weld Seam with Few Pores and Free of Holes a) Avoiding the Absorption of Gases from the Ambient Air Joining by means of fusion welding requires the liquification of the sheet edges. Most of the fluid metals have a high affinity to oxygen and nitrogen dissolved in the air. These are absorbed by the melt. When the melt cools down, its gas-dissolving characteristics decrease. Thus, the gases are discharged; if they can no longer leave the cooling melt, they are included in the weld seam and cause the formation of pores.

During welding, the weld seam can be protected with the help of a plurality of methods: vacuum, slag formation and inert gas. Welding under vacuum is the best solution from a technical point of view, but, especially in the present case, particularly complex as far as equipment is concerned. Isolating the welding seem by slag formation cannot be done, since it is impossible to safely avoid contamination of the weld seam by slag. Therefore, welding under inert gas is the method of choice. Since active gases have oxidizing effects, inert gases (e.g. pure argon) should be used.

b) Degassing the Gases Enclosed in the Material Prior to Welding

Shielding the weld seams of the sheets might be insufficient, depending on the kind of the metal used and the methods used for the production of the sheets. Series of tests with the object of finding a suitable pretreatment and welding procedure showed that in some cases sheets produced by metal smelting and annealed cathode sheets in their production state can be joined by a weld seam with few pores and without holes; electrolytically produced sheets, however, cannot be joined in this manner. The same is true when the welding procedure is carried out under inert gas. In case of cathode sheets that are not welded under inert gas but were produced by metal smelting and in case of annealed cathode sheets, pores are formed, as described above, only after the weld seam has begun to cool off. In contrast, in case of electrolytically produced sheets in their production state, pores might be formed even if inert gas is used. The melting bath movements can be so intense that the melt starts to "shoot through" and thus, holes are generated in the seam. In order to eliminate modification of the crystal structure provoked by the annealing of the cathode sheets as cause for their meltability, welding experiments were carried out after a long (24 h) annealing step at low temperatures (250 to 400° C. in the case of nickel). Even those sheets could be welded in an unproblematic manner. Pore and hole formation that might occur when electrolytically produced materials are welded is therefore supposed to have other causes than the absorption of oxygen and nitrogen from the air.

During electrolysis atomic hydrogen is formed that partially is enclosed in atomic form in the deposited metal. The different behavior of sheets produced by metal smelting and annealed cathode sheets on the one hand and electrolytically produced sheets in raw state on the other hand that is observed in some cases, is due to the hydrogen absorbed in electrolytically produced sheets. When the elements contained in cathode sheets are listed (in general in ppm contents), usually, the hydrogen content is not indicated at all. This, however, is not because cathode sheets would not contain hydrogen, but due to the fact that the hydrogen content cannot be determined by wet chemical methods. The determination of the hydrogen content is further complicated by the fact that it is not dispersed and held uniformly.

Phase diagrams show that most metals can absorb an increasing amount of hydrogen with increasing temperatures; frequently, the absorption capacity is suddenly doubled once the material is liquefied. At first sight, the boiling of the weld seam cannot be explained by the hydrogen content of the sheets. This is even more true since e.g. the inert gases recommended for the welding of nickel contain from 5% to 10% of (molecular) hydrogen ($H_2$). The addition of hydrogen to the inert gas is particularly recommended to avoid pores in the weld seam. Obviously, nickel reacts differently to atomic and molecular hydrogen.

The solubility of the hydrogen in the metal in balanced state can be taken from phase diagrams of metals and hydrogen. A solid solution of hydrogen with metal can be realized only to a small extent; if it is not in solid solution, it is included between the crystals. Inclusions are not considered in phase diagrams. Since particularly fine-grained material is formed in the case of electrolytic deposition, the number of micropores into which hydrogen might be incorporated is also particularly high. Consequently, electrolytically generated metals can absorb a significantly higher quantity of hydrogen than the quantity corresponding to the balanced composition. This may lead to an extremely high concentration of hydrogen in the metal. Even in the event of exterior pressures of 1 atm, electrolytically produced materials can behave as if they were still exposed to the high pressure of the incorporated hydrogen. The pressure can amount to several thousand bars.

While the absorption capacity for hydrogen of most of the metals increases in solid solution with increasing temperatures, the capacity to store the hydrogen incorporated in the pores decreases with increasing temperature. When the metal is liquefied during welding, the incorporated hydrogen is desorbed: it relaxes while the volume increases, which leads to interference with the vapor capillary in electron-beam welding and laser welding and to a kind of boiling of the weld melt. The "boiling" of the weld seam might be enhanced by the degassing of the marginal areas of the weld seam.

Since the biggest part of the hydrogen included in cathode sheets is not bound, boiling of the weld seams might be avoided by degassing the hydrogen prior to melting. An annealing procedure under vacuum has proved to be particularly effective, since the escaping hydrogen is pumped off.

c) Degassing of the Weld Melt

Due to the hydrogen degassing from the metal, bubbles may be formed in the melt when no degassing treatment of the sheets is performed. In light of the high requirements of the proposed method as far as an absence of pores is concerned, it is of importance that the gas bubbles that are formed leave the melt prior to solidification.

When welding is done at low temperatures, the melt is viscous, which is advantageous as thus it cannot drop through the roller gap. Gas bubbles, however, are less mobile in a viscous melt, are retained in the melting bath, and are captured in the melt when cooling off. Thus, an increased number of pores is formed. For welding the cathode sheets it is proposed to apply high welding temperatures, in order to create a low-viscosity melt. The viscosity of the melt should be of less than 4 mNsm$^{-2}$. Thus, the gas bubbles can ascend and leave the melt bath more easily. Therefore, welding methods of high energy densities should be used for welding the cathode sheets. Thus, TIG welding, MIG welding and plasma welding are particularly suited. As far as TIG welding is concerned, increased melting bath temperatures might be achieved by the use of helium instead of argon as inert gas, due to the fact that helium has an increased ionization energy.

Measures that aim at a quick heat discharge should be avoided, so as to reduce the cooling rate of the melt. Thus, the gas bubbles have more time to escape from the solidifying melt.

d) Restriction of Appropriate Welding Methods

The sheets to be joined can basically be joined by flash butt welding or by fusion welding. Flash butt welding might be unsuccessful due to the necessary high compression forces, for example if whole nickel cathode plates are to be joined. The fusion welding methods can be distinguished according to their energy density, the welding type (heat conduction welding or deep penetration welding) and according to whether welding additives that do not consist of the pure metals are required.

Characteristics of Different Welding Procedures and Differentiation of the Methods Suited for Welding Cathode Sheets

| Method | Energy Density Watt/cm$^2$ up to | Type of Welding Heat Conduction (H) Deep Penetration (D) | Electrodes With Coating | Electrodes Without Coating |
| --- | --- | --- | --- | --- |
| Gas fusion melting | 10$^2$ | H | yes | yes |
| Manual light arc welding | 10$^3$ | H | yes | meom |
| TIG welding | 10$^3$ | H | no | yes |
| MIG welding | 10$^4$ | h | no | yes |
| Plasma welding | 10$^5$ | H | no | yes |
| Plasma welding | 10$^6$ | D | | |
| Electron-beam welding | 10$^7$ | D | | |
| Laser welding | 10$^8$ | D | | |

The welding methods with the lowest energy density, that is gas fusion welding and manual light arc welding, require functional welding additives. The welding additives recommended for welding (for the welding of pure nickel e.g. welding additives of material 2.4155) and the ingredients of the coating, however, would reduce the purity level in the area of the weld seam. In addition, the energy density of the methods is too low for the generation of a low viscosity melt. Thus, both methods have to be excluded, due to insufficient energy density and since they require the use of coated electrodes.

For welding cathode sheets, particularly sheets made of nickel, the following methods can be used due to their energy density by means of which a low viscosity melt can be achieved: TIG welding, MIG welding, plasma welding, electron-beam welding and laser welding.

In TIG and plasma welding, nonmelting tungsten electrodes are used; welding according to these methods can be performed without additives or with additives of pure metal rods. With MIG welding, a melting metal electrode is used. A wire made of the pure metal to be joined may be used as electrode.

Electron beam and laser welding can be carried out without welding additives. They work with electron or photon beams with such a high energy density that the surface of the workpiece in the focus of the beam vaporizes. A vertical vapor channel (vapor capillary) is generated in the workpiece allowing for deep penetration welding to be performed. For this purpose, a critical intensity of the beam of from about 106 W/cm$^2$ is required. The melt reunites behind the vapor channel moving in welding direction and forms the weld seam when cooling down (plug method). In order to avoid a collapse of the capillary, both the vapor pressure in the capillary and the hydrostatical pressure and the surface tension of the melt have to be in balance. Thus, laser and electron-beam welding are very sensitive to interferences regarding the melt flow influencing the stability of the vapor capillary.

The high energy density of the beam methods that is sometimes several times higher than that of other fusion welding methods may be disadvantageous when welding unannealed cathode sheets. It results in the fact that gases ($H_2$) dissolved in the basic material or enclosed in micropores and gaseous reaction products (HS, $H_2S$) do not degas slowly but are discharged abruptly and expand, so that micro explosions are caused. If a part of the vapor capillary is separated by melting bath movements caused thereby, pores and even holes may be generated when the melt "shoots" through. Therefore, laser and electron-beam welding may require degassing of the sheets in case of gas content and distribution that are do not actually interfere with e.g. TIG welding, MIG welding and plasma welding.

A special advantage of methods with energy densities of <106 W/cm$^2$, that is of TIG welding, MIG welding and plasma welding lies in the fact that in case of cathode sheets with noncritical sulfur content no heat and/or vacuum treatment of the single sheets has to be carried out and thus the objects connected therewith might only achieved when the first recrystallization annealing has to be performed.

2. Purity of the Weld Seam and Use of Welding Additives

The welding method to be used should not lead to a permanent modification of the purity of the material and the characteristics of the material in the weld seam.

According to the welding method used, the weld seam may be contaminated by the material of the electrodes used during the welding process or by their coating. In order to avoid contamination, uncoated electrodes made of the pure metal to be joined may be used. In this context, it is important that the electrodes are not provided with a high hydrogen charge. It is also possible to completely avoid the use of welding additives.

3. Alignment of Sheets of Different Thicknesses

Advantageously, sheets of different thicknesses are to be joined such that the overlapping areas on the upper and on the lower side of the thinner sheets are of the same size. During the following rolling process, the overlapping areas are uniformly gripped by the rollers delimiting the roll gap.

Before the sheets are joined, the edges of the sheets to be joined can be moved up and down relative to each other, if necessary up to several mm, and fixed in the position in such a way that the following joining procedure is not influenced. This may be realized by means of tables with separated and height-adjustable plates and the sheets can be fixated by welding templates.

4. Tensile Strength and Ductility of the Weld Seam

The area of the weld seam has to be ductile so as to allow for a bending of the weld seam. Only if these requirements are fulfilled, the welded material may be coiled. In addition, the weld seams have to be sufficiently stable to tolerate the tension during winding and later during rolling.

Tensile strength and ductility of the weld seam depend, among others, on the quantity of impurities present in the sheets, which just like sulfur form low-melting eutectics. Excessive quantities of sulfur may be eliminated by annealing in hydrogen (c.f. D.V.3).

Furthermore, tensile strength and ductility depend on the pores that may be generated during the welding process.

5. Aftertreatment of the Weld Seam

Oxide scales (annealing colors and annealing scales) on the cathode sheets may be caused by the welding process and may be eliminated by brushing with wire brushes made of stainless steel, grinding, etching or bright annealing.

II. Presorting of the Cathode Sheets Prior to Joining Them

In general the cathode sheets may be joined together without any presorting step. A presorting step, however, may facilitate the rolling process, since it allows for a reduction of the disturbing thickness gaps in the raw strip. If the thickness of the sheets decreases toward the edges, the sheets are to be trimmed. Presorting, however, requires measurement and labeling of the sheets as well as the construction of an intermediate storage facility from which single sheets can be directly taken. If the cathode sheets are joined according to ascending or descending thicknesses, a longitudinally stretched wedge is formed. The wedge-like shape is particularly advantageous for leveling the thickness variations of the cathode sheets. If 100 cathode sheets with thicknesses varying by maximally 4 mm are presorted, the mean difference between two sheets maximally amounts to only 40 μm. The thickness gaps can be processed in cold rolling mills even without quickly reacting adjustment means.

Furthermore, a wedge-shaped raw strip is advantageous since the reel tensions can be varied according to the strip thickness. During the rolling and coiling process, essentially only the strip situated between the coiler and decoiler is under tension. The part of the strip coiled on the reels is clamped in by the strip situated above and protected by the current reel tensions. Thus, thicker sections of the strip that have to be more strongly reduced may be rolled with higher reel tensions in order to avoid an increase in width.

In order to obtain a raw strip only slightly deviating from the wedge-like shape and thus basically having the same advantages with a less complex presorting method of the cathode sheets, the cathode sheets can be classified only according to predetermined thickness ranges. For this purpose, the difference between the strength of the thickest and the thinnest sheet (thickness differential) is divided into partial intervals. Then, the sheets are grouped by the partial intervals within which no sorting according to the thicknesses is carried out. The sheets in the raw strip are then arranged such that the sheets of a partial interval with smaller thicknesses are arranged in front of the sheets of a partial interval with greater thickness.

Advantageously, the intervals are determined according to the thickness variations that can be processed by the intended rolling mill.

In the sorting methods described, the thickness of the sheets is a value on which the sorting is based. If the sheets are trimmed such that they have the same longitudinal and transverse dimensions, the sorting may also be based on the weight of the sheets. This leads to further sorting methods corresponding to those described above which are especially advantageous if the thickness tolerances of the sheets are greater than the differences in the mean thickness of two subsequent sheets in case that the sorting was carried out according to thicknesses.

III. Transformation of the Thickness Gaps into a Wedge.

It must be avoided that
- the edges of the thickness gaps are pressed into the material of the sheets coiled before or afterward and that thus grooves are formed in the turns situated above and under the joint.
- coatings are generated when the strip is leveled by rolling the edge.

Advantageously, the weld seam and if necessary an aftertreatment are to be designed such that a smooth transition between the different material thicknesses is achieved. If there are strong differences in the thicknesses of the plates, the weld seam can be designed in a wedge-like shape or the step at the border between the plates may be transformed into a wedge by grinding (e.g. with a grinding device) or by compression. By means of these methods, compression of the plate edges are reliably avoided during coiling, even if later higher back tensions are used at the reels. The different radius of the coil, however, may lead to an unbalanced coil, which may be avoided by modern control systems.

It might be advantageous to further expand the thickness variations already transformed into a wedge between two successive sheets. By rolling, if necessary reversing rolling, of the strip in the are of the weld seam, the thickness gap may be transformed into a longer wedge-shaped profile. Thus, further processing of the strip at higher speed is simplified. The rate at which the strip can be rolled depends on the setting of the rising angle and thus on the length of the wedge.

IV. Leveling

1. Thickness Adjustment of Non-Joined Plates

If sheets of different thicknesses are to be joined to strips, the sheets can be individually reduced to a regular cross section by rolling before they are joined. It may also be advantageous to individually roll only the thickest sheets in order to reduce the differences in the cross sections of the material to be joined.

The rolling of sheets is a comparatively unproductive method. Working with front and back tension is not possible; when rolled the thicker sheets become wider than the thinner ones. In the case of sheets of different thicknesses, the different transverse expansions lead to the formation of scrap metal. Evidently, the sheets are also longitudinally expanded by rolling, so that roller conveyors of corresponding length are required downstream and also upstream of the mills in case of reversing rolling. Since the strip is not fixed by reels, it becomes more difficult to align the sheets during the rolling process, the longer they are. Thus, the risk of producing scrap metal by rolling is increased. When the sheets are removed from the roller table the material sags; knicks and damages to the edges are easily caused.

Therefore, it is particularly recommended to roll individual sheets before they are joined if the strengths of the sheets or even only of the thickest sheets exceed the thickness of the intake strip of existent strip rolling mills. In this context, the sheets should be several mm thick even after the reduction, such that they cans still be transported in an easy way. When the sheets are rolled, all sheets can be brought to the same thickness (e.g. the minimal thickness of the sheets), but the thickness may also remain irregular and the further adjustments regarding the thickness may be carried out according to the method described in the following.

2. Thickness Adjustments in the Raw Strip

The sheets joined to form the raw strip may be leveled by rolling, particularly cold rolling or by drawing under tension, particularly roll drawing. If possible, hot forming is to be avoided, as the material oxidizes during the procedure and the oxide layers are difficult to eliminate.

a) Rolling

Processing of the joined sheets can be carried out with devices used in cold rolling. Advantageously a prestrip made of less expensive material is welded to the first and the last plate in order to minimize the production of scrap material in further processing steps.

Rolling stands serve for reducing material of approximately constant cross section into material of approximately constant cross section. An approximately constant cross section is one condition allowing the operation of rolling stands at very high speeds (e.g. 1000 m/min). The proposed processing by rollers is surprising to one skilled in the art, since the comparatively large thickness variations in the starting material require rolling at very low speed (about 30 to 50 m/min). While profiles in the cross section can be eliminated by roller bending methods, step like modifications to the longitudinal section of the strip cannot be controlled in mills operating at high speed. If material with step-like modifications to the longitudinal section is rolled at high speed, the strip breaks.

Even though strips with thickness variations of several millimeters within intervals of max. 1000 mm have not been rolled so far, rolling is extremely suitable as a method for adjusting thicknesses. This is due to the fact that rolling basically is a method for compressing material. The use of strong tensions results in the almost complete longitudinal adjustment of strip thicknesses instead of a transverse expansion. Thus, the production of scrap metal resulting from the different thicknesses can be avoided.

The strong modifications to the thickness profile of the raw strip over short distances that so far are unknown in the rolling of metal strips, cannot be controlled by means of the conventional control concepts and hydraulic settings. Flexible rolling of strips not having a constant thickness over the length of the strip requires an integrated program-controlled roll gap regulation. For rolling, a stand with high reel tensions, great rolling force and as small a diameter of the work rolls as possible is required. A desirable adjustment rate of e.g. 50 mm/s is about ten times as high as the adjustment rates currently applied. The roll gap is controlled by setting data specially determined by regulation algorithms. Therein, in addition to the data of the original material, the solidification caused by rolling or respectively the desolidification caused by annealing as well as strip tension failures caused by circularity errors of the coil have to be considered. The longitudinal profile, the intake and output speed of the strip, have to be continuously determined.

Roll mill commands and settings corresponding to the profile cited above have already been developed for the generation of a defined thickness profile in rolling direction and have been used in the production of custom-rolled blanks. The requirements are essentially the same, only that the object is exactly inversed, that is, rolling a thickness profile into a starting strip of constant thickness.

Several methods are proposed for leveling the raw strip:

In case of wedge-shaped arrangement and joining of the cathode sheets, the resulting wedge can be rolled from thick to thin or from thin to thick in the first reduction stage.

Subsequent to the first method variant, the raw strip is rolled from thick to thin, starting at the thickest point, with decreasing degree of reduction. The thickest point is reduced to an intermediate thickness by the maximal thickness reduction achievable in one reduction stage. The reduction stage is completed once the wedge-shaped raw strip has been reduced to the intermediate thickness until the point at which its thickness for the first time corresponds to the intermediate thickness. The maximal degree of reduction for the next stage is determined considering the increase in hardness in the sections of the strips that were most strongly reduced. The next reduction stage starts with the sections of the strip that already were most strongly reduced. The procedure is repeated until the strip has to be (intermediately) annealed; thereafter, the process is continued in the same manner until the strip has an approximately uniform thickness.

Subsequent to the second variant of the method, the raw strip is rolled from thin to thick with an increasing degree of reduction. First of all, the roll gap resulting in the maximal degree of reduction when the thickest sections of the strip are rolled, is calculated. The rolling process then starts at that point of the wedge-like shaped strip with identical thickness to the predetermined roll gap. The further treatment is carried out corresponding to the first method variant.

Reversing rolling combines both variants by alternating the variants after each reduction stage.

In the case of sheets that are connected to each other without being presorted, the thickness of the strip can be leveled in several rolling steps with respectively reduced roll gap, advantageously by reverse rolling.

The leveling may refer to the whole raw strip, where the reduction of the roll gap between two reduction stages and the rolling rate have to be at such a low level that, when a thickness gap meets the rolls delimiting the roll gap, tears of the strip and damages to the rolls are avoided.

Alternatively, each plate, starting with a plate thicker than the following and the preceding plate, particularly starting with the thickest plate of the strip, can be rolled down to the thickness of the thickest following or preceding plate. Plates of identical thickness thus produced are treated as one plate in further rolling steps. In order to allow for a precise command of the rolling mill, the strip profile has to be determined continuously.

The respective variant of the method is repeated until the whole strip has such a regular thickness that the thickness tolerances that can be processed by the rolling mill are not exceeded when rolling is performed at high speeds. Further reductions in the thickness can only be performed at higher rolling rates.

In the first reduction stages, the individual cathode sheets are deformed to a varying extent, depending on their original thicknesses. Thus, sections of different states of solidification are formed. The rolling of strips consisting in sections of different states of solidification is not known yet.

b) Drawing Under Tension and Compression

The raw strips might also be brought to a uniform thickness by drawing under tension and compression. By means of a tensile force acting at the discharge side of the tool, the material is drawn through a narrowing opening in the tool. If the tool opening is limited by rolls, the method is called roll drawing. In the tool, the material is deformed by tensile force and pressure.

V. Elimination of Planarity Defects

Cathode sheets made from starter sheets are usually wavy. Planar defects may for example be eliminated by rolling and annealing or by leveling.

VI. Annealing

Cathode sheets have a series of disadvantages that are caused by their manufacture: high hardness, gas and, according to the method of production, sulfur content and surface irregularities. By leveling according to the proposed rolling or roll drawing procedure, the individual sections of the sheets have different solidifications. When metal is annealed, coarse grains may be formed in the sections that are not sufficiently solidified, rendering further processing more difficult. The proposed method is also supposed to prevent the formation of coarse grains. As a result of joining the sheets and due to the different degrees of reductions, an nonhomogeneous structure is formed. A regular structure is formed by annealing, if required in combination with rolling.

The disadvantages of cathode sheets in production state and in the state of the raw strip cited above can be eliminated by an annealing process, if required a multistage annealing process.

1. Elimination of the Fibrous or Respectively Columnar Structure

Electrolytically produced metals are very fine-grained, they might as well be nanocrystalline (EP 0670916), which explains the high hardness of cathode sheets. In light of the problems caused by their hardness and maybe brittleness, cathode sheets are hardly suited for processing into strip. Frequently, a fibrous or columnar structure is formed perpendicular to the plane of the sheets due to electrolytic deposition, thereby rendering a deformation by compression particularly difficult. One skilled in the art will therefore rule out a method for processing cathode sheets requiring deformation. Therefore, it is proposed to transform the fine-grained, fibrous or columnar structure formed by electrodeposition into a coarse-grained and non-fibrous/non-columnar structure.

Electrolytic depositions may be recrystallized like strongly deformed metals by annealing; the recrystallization temperature depends on the depositing temperature.

2. Elimination of the Gas Content

Due to the production, electrolytically produced cathode sheets, e.g. made of cobalt, nickel, copper, iron, zinc and tin have a comparatively high hydrogen content. Hydrogen causes defects in welding and may cause hydrogen embrittlement in the material.

In order to reduce the hydrogen content by at least 90%, the sheets may either be moderately heated over a longer period (in the case of nickel about 18 to 24 h at 180-250° C.) or they have to be temporarily annealed at high temperatures (in the case of nickel about 30 minutes at 800-1000° C.), preferably under vacuum. The choice of the method depends, among others, on the influence of the heat treatment on the crystal structure.

3. Reduction of Sulfur Content

If metals are precipitated from sulfates, the sulfur content present can be increased. Sulfur may cause grain boundary corrosion. Sulfur may be converted into $H_2S$ and HS and discharged by means of high temperature annealing in hydrogen.

4. Elimination of Surface Irregularities.

Surface irregularities ("warts") are leveled by one or more reduction stages. The rolled warts, however, do not completely merge with the original material. The merging is achieved by coarse grain annealing. The coarse grain may be eliminated by recrystallizing annealing subsequent to a minimal deformation.

5. Recrystallizing Annealing

Between the single reduction stages the strip is to be annealed as necessary in recrystallizing manner. The recrystallization temperature depends on the preceding deformation and possible concomitant elements. The shorter the annealing time, the higher is the annealing temperature achieved in a recrystallization process.

When recrystallizing annealing of undeformed or only slightly deformed strip sections is carried out, the grain size is maintained, due to the fact that no new crystals are formed. Only in case of a critical degree of deformation, recrystallizing annealing leads to a new formation of crystals. Since during this deformation, however, only few crystal seeds are formed, a coarse grain impairing further processing is formed. In order to avoid the formation of coarse grains during annealing, strip sections that are to be deformed in all reduction stages between two annealing processes with the critical degree of deformation in total are in total subjected to a minimal deformation in which process no coarse grain is formed anymore. In this context, however, a narrow transition area can hardly be avoided in practice. Consequently, only parts of the strip have to be deformed by rolling between two annealing processes. This would not only be difficult if the sheets were not joined to form a strip according to ascending or descending thickness, but it is also undesirable, since thus thin sections of the band would become even thinner.

6. Production of Identical Grain Sizes in the Leveled Strip

The grain size resulting from recrystallizing annealing depends, among other factors, from the grain size present prior to annealing. Prior to annealing, the strip produced according to the invention has different grain sizes due to structure modifications during welding and the different deformations. The differences in grain sizes have to be eliminated since otherwise the material could not be further processed in a process-safe manner.

In the case of metals having a phase transformation (e.g. iron) a uniform grain size can be achieved by normalizing annealing (normalizing). By heating and cooling, a double phase transformation is achieved, eliminating earlier influences on the structure. The crystals formed during the transformation are largely independent from the original grain size; the same is true for inverse transformation. By normalizing annealing a fine, uniform structure throughout the whole strip is realized. In metals having no phase transformation, an adjustment of the grain size can be produced by several, very different methods by setting the degree of reduction and by adjusting the annealing process.

The recrystallization grain size depending on the degree of deformation shows a hyperbola-like curve. Low degrees of transformation exceeding a minimal transformation lead to a big grain size. An increasing degree of transformation leads to a decrease in the grain size in order to become almost constant again with further increasing degrees of transformation. If a strip with sections of different degrees of solidification is additionally deformed to such an extent that the total degree of reduction of the so far least reduced sections of the strips is within the area of the hyperbola, where an increase of the degree of transformation during the following recrystallization hardly leads to a refinement of grains, a finer grain is formed in the overall more strongly deformed sections of the strip during the annealing process; the deviation of the grain sizes in the whole strip, however, is only a minor deviation. Thus, by choosing the degree of transformation, the grain size may be adjusted.

The recrystallization temperature depends substantially on the preceding deformation. The stronger the reduction, the lower the recrystallization temperature and the more fine-grained the formed structure. If the annealing procedure is continued once the primary recrystallization is completed, the grains start to grow. If a strip that was exposed to different deformations is annealed in a recrystallizing manner, and if the annealing temperature is set at such a high level that also the slightly deformed (but above the required minimal deformation) sections of the strip recrystallize, then the recrystallization temperature is already exceeded in the strongly deformed sections of the strip. In those sections, increased grain growth already starts at a moment at which the recrystallization in the less deformed sections of the strip is not yet completed. Since after the recrystallization the strongly deformed sections of the strip have finer grains than the slightly deformed sections of the strip, the grain growth leads to largely equalized grain sizes in the strip. Consequently, the grain size may be equalized using only by the exact choice of annealing temperature and annealing duration.

Alternatively, a coarse grain may initially be generated in the strip. Subsequently, the strip is rolled at such a degree of reduction that subsequent annealing leads to recrystallization. Then, a regular structure is realized by recrystallizing annealing. The formation of coarse grain may be achieved by

- Slow annealing at higher temperatures than necessary for recrystallization. Grain growth at the expense of the number of grains occurs (enlargement of the grains).
- Strong reduction and annealing at high temperatures (secondary recrystallization). This method, however, is only suited for the production of thin strips compared to the starting material, due to the strong decrease regarding the cross section (of about 80% and more).

VII. Use of Strips from Electrolytically Produced Sheets

1. Use for Deep Drawn Parts with Thin Walls

The thinner the wall of the deep drawn part, the more important is a starting material that is free of inclusions, particularly nonmetallic inclusions. Such inclusions are for example very hard oxides that do not deform when the material surrounding them is deformed. Thus, in thin material, holes can be generated during deformation. If pressurized containers are formed from the deep drawn part, such as may be the case with e.g. battery housings and aerosol cans, inclusions in the walls of the parts form weak points.

The requirements regarding iron materials from which deep drawn parts are generally made are extremely high if one brings to mind the production process of strips that are produced by metal smelting; only very few steel producers worldwide are capable of producing them in a process-safe manner. As far as nonmetallic inclusions are concerned, the requirements regarding e.g. the material from which battery casings are formed are the following:

less than 0.2 inclusions per $m^2$;
individual particles no larger than 1 µm;
inclusion clusters not exceeding 5 µm.

Frequently, surface treated strip, e.g. nickeled strip, is used for corrosion resistant deep drawn parts. If nonmetallic inclusions are found only after the first surface refining procedure, there are no alternative applications for the strips treated in such manner. Since due to the high processing rate of the strips, sections with defects cannot be sorted out, it is possible that a whole batch has to be scrapped.

Cathode sheets can be produced practically without any inclusions. Therefore, the strip produced form cathodes sheets is extremely well suited for use as a starting material for thin deep drawn parts.

2. Use for the Production of Thin Structures in Flat Material

Strip sections having thin and accurately defined structures, particularly in the form of partial etchings (etchings to form reliefs) and complete etchings (e.g. holes and slots) are required in a variety of applications. Holes and slots are for example formed in sheets serving as filters and screens, as templates in printing and exposing and as coding disks, lead frames and shadow masks. In this context, high requirements are made regarding the etching geometry. In filters produced by complete etching, particles of a certain size are to be passed, larger particles are to be retained. In the case of shadow masks, the holes serve for focusing the electron beam. By means of relief etching, for example, fine channels in bipolar plates for fuel cells may be produced.

If the strip to be etched contains inclusions, the inclusion and the surrounding strip are etched at different abrasion rates, resulting in a failure to achieve the desired etching geometry.

Thus, strips that are free of inclusions such as the strips that can be produced by the inventive method, are used as starting material for the generation of fine structures in sheets and strips.

3. Use of Sheets Produced by Transverse Separation of Strips as Starter Sheets

In electrodeposition the metal may be deposited on permanent cathodes and on starter sheets. Subsequent to the deposition on permanent cathodes, the deposited metal has to be stripped off. Chrome and manganese deposits are so brittle that they break most of the time when stripped; if that is the case, they are obtained as flakes. Starter sheets, on the other hand, are generated in an abbreviated electrolytic process on permanent cathodes. Currently, starter sheets are of economic importance in the production of nickel, since copper producers have already adapted their production to permanent cathodes.

The production of the starter sheets takes about 15-25% of the capacity of the reservoir that then is missing in the production of the final products. Since the starter sheets are thin compared to the cathode sheets, they have to be stripped off manually. In the production of nickel, the starter sheets are deposited on permanent cathodes consisting of titanium. Due to the high cost for titanium, titanium permanent cathodes lead to a significant capital investment. The surface of the permanent cathodes has to be smoothed by grinding before they are used again. Thus, the life of the permanent cathodes is limited. For economic reasons, the starter sheets are as thin as possible, on the other hand, thin sheets do not have sufficient stability, so that they may be slightly wavy in the electrolysis bath and result in just as wavy cathode sheets. Therefore, the starter sheets have been solidified by hammering by some companies. Frequently, they are stiffened by bending the ends or by impressed beads.

In order to avoid the disadvantages of starter sheets, the deposition on permanent cathodes largely prevails in the case of some metals, such as copper. If permanent cathodes are used, however, the cathode sheets have to be stripped using special machines and the sheets have to be ground before each application. The procedure leads to a high capital investment due to the sheets in circulation and the machines required for stripping and to efforts in the form of interest on and depreciation of the machines and permanent cathodes. If starter sheets of high quality were available at low costs, a return to the use of starter sheets would also be advantageous in the case of metals currently being deposited on permanent cathodes.

Starter sheets have to be of high quality, since they directly determine the geometry and the purity of the final product. The demands regarding starter sheets are correspondingly high:

Purity of the starter sheets. If material of high purity is to be produced, processing of sheets produced by metal smelting is excluded.

Purity of the surface. Impurities become components of the cathode sheet.

Metallically clear surface. The starter sheet has to be covered uniformly with the deposited metal Therefore, the starter sheets are anodically depassivated in practice and stored in boron water until their application.

Planarity. The sheets have to be completely flat ("dead flat") and in particular the ends must not bend, since otherwise short circuits might be caused. The same is true as far as wavy shapes and other planar defects are concerned. Frequently it has been observed that starter sheets that were planar at room temperature are distorted after being exposed to an electrolysis bath for a short time (U.S. Pat. No. 2,578,968, column 1, line 18 ff, U.S. Pat. No. 6,153,082, column 2, line 9 ff), even though the bath temperature, depending on the metal, is only between 30 and 60° C.

Strength. The better the strength of the starter sheets, the thinner, and thus the less expensive the starter sheets used can basically be.

The observed bending in the electrolysis bath is caused due to the fact that the sheets are not totally free of stress. Starter sheets in the form of electrolytically deposited sheets are already exposed to stresses due to the way they are produced. When the starter sheets are stripped off the permanent cathodes manually, the starter sheets are bent and thus further tensions are created. In the case of sheets produced from rolled strips, a plurality of stress-induced planar defects may occur: coil set, gross bow, edge waves, camber, long waves and center buckles. A coil set is particularly destructive for the use of sheets as starter sheets, since it might lead to a contact between anode and cathode, thereby provoking a short circuit. Strength and flatness are contradictory requirements. The better the strength, the higher are potentially the internal stresses resulting in planar defects. Since flatness is the more important criterion when the sheets are used as starter sheets, a compromise is made at the expense of the compactness.

Productive strategies for setting reduced values of compactness are e.g.:

stress relief annealing or incomplete recrystallization annealing of solidified material;

recrystallizing annealing with subsequent solidification.

The desired solidification can be achieved by means of a reduction stage, e.g. a skin pass. By rerolling existing planar defects may be reduced, but additionally, new internal stresses can be caused that might result in new planar defects.

The strip produced according to both productive strategies is not sufficiently planar for the intended application and still has internal stresses. A higher degree of flatness can be achieved in the partially solidified strip by (Bend) straightening. (Bend) straightening may be performed instead of or in addition to rerolling. A plastic deformation, by means of which internal stresses are eliminated, is a characteristic of (bend) straightening.

Stress-relief annealing. Internal stresses exceeding the straightening limit are eliminated automatically by plastic deformation. Internal stresses below the straightening limit may be reduced but not completely eliminated by stress-relief annealing. Since the straightening limit decreases with increasing temperature, annealing temperatures that are as high as possible but below the recrystallizing temperature are recommended in order to eliminate stresses to a large extend. Stress relief annealing is characterized in that the solidification is largely maintained.

(Bend) straightening and stress relief annealing may be performed sequentially, but also simultaneously (tension annealing). In tension annealing, the material is heated and tension is simultaneously applied.

All requirements regarding starter sheets can be fulfilled by sheets obtained from strips that were produced according to the invention and transversely separated. The sheets are at least of the same purity as the material to be deposited thereon. The purity reaches at least such a high level because the contents of sulfur, carbon and hydrogen can be essentially (>90%) reduced compared to the contents of the impurities in cathode sheets by annealing (e.g. in OC-processes or by the application of continuous annealing). Both roughness and strength can be precisely set by rerolling. By (bend) straightening the strips, completely flat ("dead flat") sheets can be produced. By stress relief annealing of the strips, largely stress-free sheets can be produced.

Prior to their application, it is only necessary to weld loops to the sheets, by means of which they can be positioned in the electrolyte bath.

4. Use of Foils of Electrolytically Produced Sheets as Substrate for Superconductors It is known that in cubic surface centered metals and alloys, e.g. in copper, nickel and iron-nickel alloys, a cube texture may be generated by means of strong reduction and subsequent annealing. Highly pure material is required to generate a cube texture and it is advantageous if fine-grained structure is present before the last cold rolling step is performed.

In nickel, a cube texture can be generated by means of rolling with a degree of reduction of >90% and subsequent annealing at 800 to 1000° C. Since minor impurities, particularly with Co and Al, already prevent the formation of a cube texture, but Co is deposited in electro deposition, usually carbonyl nickel is used for the generation of a cube texture. It is possible, however, to produce cobalt-free nickel cathodes by precipitating cobalt from the electrolyte or by removing it by solvent extraction.

Foils of material that was produced electrolytically or according to the invention, are particularly suited for the generation of a sharp cube texture due to their high purity.

Such films can be used as substrates for super conductors.

5. Ultra Low Carbon Metals (ULCM)

Carbon provokes graphite deposition, compromising the ductility, for example in nickel after longer heating in the range of 425-650'C. Electrolytically produced nickel is practically free of carbon; the carbon content amounts only to max. 0.0002%. By annealing in hydrogen, the carbon content can be reduced even further until it lies below the detection limit.

Nickel poor in carbon (norm: <0.02% C) can only be produced by metal smelting by means of particularly complex procedures (LC nickel, nickel 201). Thus, the C content of electrolytically produced nickel is at least 99% below the norm for LC nickel.

The same is true for other metals, e.g. iron,

6. Use of the Metal Strip after Intended Addition of Admixtures

The surface of the produced metal strip can be coated by PVD, CVD, ECD, galvanizing, fire coating, spraying, plating and other methods. The material of the coating can be dispersed in the metal body by diffusion. The metal strip produced can also be provided with admixtures by carburizing, nitrating, borating and other methods. If necessary, the admixtures can be dispersed more evenly in the metal body by diffusion. Thus, steel can be produced for example by carbonizing an iron strip.

7. Use of the Strip for Battery Connections (Particularly Cell Connectors, Electric Leads and Pole Contact Plates) and Battery Parts (Particularly Connection Poles)

The parts connecting a battery with the supplied device (on the side of the battery: connection poles and electric leads; on the side of the device: pole contact plates) and the batteries with each other (cell connectors), have to have high electric conductivity. In addition, they are also supposed to have a high level of purity; to be free of nonmetallic inclusions in order to improve weldability and have only little minor oxides so that the contact resistance remains low, tool ware is avoided and solderability improved.

The requirements are partially fulfilled by nickel strips produced according to the invention and partially by copper strips produced according to the invention.

E. ADVANTAGES ACHIEVED

The Advantages of the described method are both technical and economical advantages; in addition the method contributes to the protection of the environment.

The technical advantages are mainly based on the fact that the high purity and the absence of inclusions of the cathode sheets are maintained in further processing. In addition, the surface is only oxidized to a low extent, contrary to the production by metal smelting.

The economic advantages are based on the fact that the particularly energy and cost intensive processing steps required for the production of strips by metal smelting are avoided and are replaced by a heat treatment, a joining and a rolling stage according to the inventive method. In addition, the production of scrap metal is almost insignificant from an economic point of view in the method described, due to the high level of purity of the scrap metal. This is not true for the waste material generated when metal smelting is performed. The top discard generated in the ESR-procedure contains the impurities extracted from the rest of the ingot; the grinding waste is rich in oxides and interspersed with the residues of the grinding medium; in case of etching, the material is dissolved.

The environment is protected, since the method described is less energy intense than the prevailing melting metallurgy and since waste in the form of gases, slags and scales generated in the latter is avoided.

F. DESCRIPTION OF AN EXAMPLE OF THE INVENTION

Production of Nickel Strip from Cathode Sheets

Among the metals traded at the LME, only copper and nickel are available as cathode sheets. The exemplary illustration of the invention focuses on nickel. According to first calculations, the reduction of the processing costs in the production of nickel strip compared to the production by metal smelting amounts to about 2500 per ton; that means about 65% of the processing costs.

For the tests, Russian nickel cathode sheets were used, since the sheets could also be welded and coiled without a heat pretreatment due to their low hydrogen and sulfur contents. The sheets were formed by deposition on a starter sheet, as determined by microscopic examination. Due to the use of starter sheets, the sheets are not planar. The longitudinal deviations are of up to +/−30 mm and the transverse deviations of up to +/−55 mm in the case of the predetermined dimensions of the cathode sheet being of L 1005 mm×W 855 mm. The thicknesses of different sheets are between 4 and 6 m, there are also slight thickness variations present within one sheet. The thickness of the sheets decreases to reach 1 mm at the edges; therefore, the marginal areas have no right-angled profile. The surfaces of the sheets are covered with drop-shaped cavities. The hardness of the basic material of the sheets is of 46-49 HRC, the hardness of the cavities of 42-45 HRC.

I. Structure of Electrolytically Produced Nickel

Nickel has a cubic surface-centered lattice from absolute zero to the melting temperature. Generally, nickel can be strongly deformed due to the lattice structure.

Electrolytically produced nickel has a very fine-grained and, according to the production method, a fibrous or columnar structure perpendicular to the cathode plane. It has the same processing characteristics as strongly deformed nickel, thus, it is difficult to further process the nickel. In order to facilitate processing, the nickel sheets may be annealed with recrystallization under nonoxidizing atmosphere.

II. Chemical Analysis of Electrolytically Produced Nickel and Consequences for Processing it 1. Chemical Composition The material has the following chemical composition: Selected elements of the chemical composition of nickel cathodes

|  | Ni | Co | H | C | S | Mn | Mg |
|---|---|---|---|---|---|---|---|
| Producer info. (Ni + Co min, others max.) | 99.95 | 0.1 | n.s. | n.s. | 0.001 | n.s. | 0.001 |
| EDX analysis 1 | 99.93 | 0.057 | n.s. | <0.0002 | 0.0011 | <0.0004 | n.s. |
| EDX analysis 2 | 99.94 | 0.048 | n.s. | <0.0002 | 0.0002 | <0.0004 | n.s. |

All contents in % by weight; n.s.: not specified

2. Sulfur Content

Analysis of the chemical composition of cathode sheets of nickel show that the sulfur content may be very to (<2 ppm) and that it is significantly lower as when nickel is produced by metal smelting. Russian cathode material has a sulfur content of up to 10 ppm; the magnesium content is within the same range.

Nickel is susceptible to corrosion along the grain boundaries caused by sulfur, tin, zinc and bismuth. For example, sulfur that was not dissolved in the nickel reacts with nickel at a temperature exceeding 400° C. to form nickel sulfide ($Ni_3S_2$); the melting temperature of the eutecticum of nickel and sulfur is of 643° C. The low-melting Ni—S compounds disperse along the grain boundaries and compromise the cohesion of the grains. In welding, corrosion along the grain boundaries leads to embrittlement, heat embrittlement in hot shaping (high temperature embrittlement) and in cold extrusion to cold embrittlement (surface embrittlements). High-temperature embrittlements are caused by sulfur contents starting at 2 ppm; cold embrittlement at higher quantities.

The low content of sulfur in nickel cathodes, however, is more dangerous than the higher content with metal smelting. This is due to the fact that nickel produced by metal smelting contains a sufficient quantity of alloy elements, such as manganese, magnesium, niobium, titanium and aluminum that are supposed to bind sulfur. The impurities are not present in a sufficient quantity (magnesium) or not at all (manganese) in the case of electrolytically produced nickel.

Therefore, the content of sulfur has to be removed, if necessary, by annealing the nickel sheets in hydrogen with formation of $H_2S$ and HS.

For simulating the bending of the sheets on a reel, bending experiments were carried out on welded cathode sheets with a diameter of 508 mm. In this context, no surface embrittlements were observed at the bending site. Only when the sample was bent by 100°, flaked embrittlements were observed at the untreated heat affected zone, but not at the weld seam. Consequently, no desulfurizing annealing of the strip was carried out before the welding or respectively rolling process.

3. Hydrogen Content

The hydrogen content of electrolytically produced nickel cannot be determined by wet chemical methods; consequently, it is not specified most of the times; nonetheless, it is significantly higher than in the production of nickel by metal smelting. During electrolysis, hydrogen is also deposited and incorporated into the metal. Also, hydroxides may be formed that can be incorporated into the metal as well. The hydrogen contents specified for "cut cathodes" sometimes do not allow for conclusions to be drawn regarding the hydrogen content of cathode sheets, since some producers anneal the "squares" resulting from longitudinally and transversely cut sheets prior to delivery.

If the lattice is saturated with hydrogen, nickel behaves as if it was under extremely high pressure. The hydrogen atoms cause an expansion of the metal lattice. This might lead to nickel becoming very hard and susceptible to embrittlement. Efflorescences may appear on the surface. Hydrogen may also be incorporated into micropores in which high pressure is present when the lattice is saturated.

The hydrogen content can and maybe has to be eliminated by heating (preferably under vacuum).

Welding experiments were carried out with annealed and unannealed sheets. By means of TIC welding, it was possible to join the sample material even in the unannealed state by means of closed weld seams free of pores. Consequently, no annealing for eliminating hydrogen had to be performed in the case of TIG welding. As far as electron-beam welding of unannealed sheets was concerned, however, the vapor capillarity was disrupted in an at first inexplicable process even when sample sheets were welded under vacuum, which might probably have been due to high local concentrations of hydrogen. In the case of annealed sheets, the disruptions were not observed. The same results were observed in laser beam welding, even when a purging with inert gas was performed on the lower bead.

III. Process Steps

1. Straightening

The sheets used were produced using starter sheets. Therefore, they were straightened prior to trimming.

2. Trimming

The cathode sheets are either trimmed at all edges or only at the edges that are to be joined by welding.

It is not necessary to cut off the edge area that is not true in thickness; the thinning of the edges allows in fact for TIG welding to be carried out without having to use welding rods made of the pure metals, but on the other hand, the maximally achievable strip thickness is reduced and rolling is complicated.

Trimming of the sheet edges leads to a hardening of the cutting sites that may influence the quality of the weld seams in a negative manner. For welding nickel, material that has been stress relief annealed or soft annealed should be available. Thus, trimming should be carried out as a process step prior to annealing. The sample material was trimmed at the later longitudinal sides in order to provide for a uniform width of the strip and additionally at the future transverse sides in order to obtain straight edges that allow for a gap of 0.15 mm to be formed, the maximal allowed gap between the sheets for electron-beam, welding and laser welding. As far as TIG welding was concerned, the quality of the weld seams was also sufficient in unannealed material.

The scrap material formed in the process steps has the same level of purity as the basic material and may be used for the same applications as cut cathodes. Therefore, the formation of scarp metal in the process stages described is of no economic importance.

3. Annealing

Reasons for Annealing:

Recrystallization of the fine-grained columnar or fibrous structure of the sheets;

Destabilization of the edges subsequent to trimming;

Reduction of the sulfur, hydrogen and carbon contents.

A fine-grained structure of electrolytic nickel can be transformed into a grained structure by vacuum annealing at 1000° C. for a period of 4 hours without the material having to be deformed first. In soft annealing, the grain size increases quickly with increasing temperature. The formation of a coarse grain leads to surface roughness. At soft annealing temperatures, nickel sheets are susceptible to "stickers." If there is a risk of the formation of stickers, for example because the sheets are stapled or strips are coiled under because of high back tension, the annealing temperature should not exceed 900° C.

Advantageously, annealing is performed under vacuum in order to drive out the hydrogen contained in the sheets. Hydrogen can be drawn out of the nickel cathodes by means of vacuum annealing at 700° C. to 800° C. within four hours.

The furnace atmosphere is to range from neutral to slightly reducing, but never oxidizing, due to the fact that the formed oxides are very adhesive. Thanks to annealing in dry hydrogen, the surface remains free of scales.

4. Welding.

The sites to be welded are to be free of scales and grease; therefore, the area of the weld seam (about 25 mm) has been brushed bright metallic Phase transformations do not occur during heating and cooling. Since welding methods of high energy density have been selected, only a small heat-affected zone is formed, to which the structure modifications caused are limited. An aftertreatment of the heat-affected zone for achieving uniform softness has not proved necessary, contrary to the patent literature (DE 2905508, claim 3 and page 3, line 23 ff), since the welded material could be bent to a sufficient extent to be coiled. An exclusively thermal structure treatment would not be appropriate in the case of nickel as a one-phase material for the elimination of the coarse grain formed in the heat affected zone during welding.

It is possible to weld several plates at one time in order to accelerate the production of the strip. The raw strip thus produced can be trimmed, if required.

a) Welding Method Requirements

The welding method requirements have been described above (c.f. D.I.).

(a) Weld Seams Free of Pores

In order to avoid the formation of pores in the weld seam, the welding bath must not get into contact with air.

Nickel reacts differently to different gases; the formation of pores starts when the following quantities are contained in the welding atmosphere:

| gas | critical content in % |
|---|---|
| nitrogen | 0.5 |
| oxygen | 5 |
| carbon monoxide | 5 |

If about 10% of hydrogen is present in the inert gas, and if helium is used as inert gas, the susceptibility of pore formation is reduced. The presence of hydrogen in the inert gas, however, leads to an increased susceptibility to embrittlements.

Experimental TIG welds were carried out with pure argon, the laser welds with helium as inert gases. The root bead was only purged with inert gas in the case of laser welding. The seams of the TIG welds were free of holes and pores despite the absence of a purging of the root bead with inert gas.

Electrolytically produced nickel contains hydrogen. At increasing temperature, the holding capability for the hydrogen incorporated in micropores in the metal decreases. Thus, heating of the metal during welding leads to the material being degassed and to a "boiling" of the weld seam. Consequently, holes are generated in the weld seam preventing the formation of a continuous weld seam. If the material was further processed under tension, it might break at the weld seams. Also, the holes formed in the weld seam are not closed during further processing. The hydrogen contained in the sheets is therefore advantageously degases by heating (preferably under vacuum) (c.f, F.III.3). In TIG welding, the hydrogen content or the local concentration of the hydrogen was proved to be unproblematic. Consequently, no degassing annealing process had to be performed on sample sheets according to the method.

(b) Purity Level if Welding Additives are Used

Among other characteristics, welding additives have the following functions: The gases dissolved in the welding bath can be bound by deoxidizing or gas-binding alloy additives in the additional welding materials, such as titanium, aluminum, manganese and silicon, thereby preventing the formation of pores. Just as any other pure metal, nickel has no wide melting range but a melting point. When the melting point is reached, nickel is abruptly liquefied, and there is a certain danger that the fluid melt might "sink in." Additional welding materials are frequently used for cooling the melt.

In the present case, however, the use of additional welding materials is undesirable, since such a use would interfere with the purity level of the nickel, with the exception of pure nickel electrodes with reduced content of hydrogen. Such pure nickel electrodes have been used in TIG welding. Thus, it was possible to avoid a sagging of the root.

(c) Joining of Sheets, Particularly of Sheets of Different Thicknesses

Due to the rectangular form of the sheets and the fact that electrolytically produced sheets do not dispose of a heat rolling texture, both the width and the length of the sheets may become the future width of the strip.

In order to prevent the melt from sinking in when nickel is welded, it is generally recommended to limit the energy supply to the extent absolutely necessary for welding. This has been ignored in the attempts to obtain a low-viscosity melt and thus weld seams that are free of pores. In order to maintain the effect of capillary forces, the melting area was kept small by cooling with pure nickel melting additives. Only a small gap remained between the sheets to be joined. It is narrower than usually recommended in TIG welding due to the selected high melting temperature.

It has to be possible to join sheets of different thicknesses. It is recommended to join the ends of the sheets in the form of a V-seam, (70°) with a vertical root of about 0.5 to 3 mm; the gap between the sheets may be between 2 and 3 mm wide. In contrast to the recommendation, the sheets were prepared for welding with a slant of 60° and without vertical root. The root gap has been limited to 1-2 mm. Further adjustment of trimmed edges of the sheets was not necessary in electron beam and laser welding; the gap between the sheets was no larger than 0.15 mm.

To avoid distortion,
heat can be dissipated by means of a copper mat near the welding zone;
the sheets are clamped and cooled in the clamping device.

No copper mat was used in order to promote slow solidification of the melt, thus favoring the formation of weld seams without pores.

(d) Tensile Strength and Ductility of the Weld Seam

To allow for coiling and rolling at high tension of the welded seam, the area of the weld seams has to be ductile and resistant to tensile strength.

The tensile strength of electrolytically produced, unannealed nickel with weld seams produced by TIG welding (265 MPa) was below the lower limit of the spectrum for recrystallizing annealed pure nickel produced by metal smelting (380 MPa). The tensile strength was shown to be sufficient for the scheduled processing steps. The ductility was sufficiently high, too.

b) Choice of Suitable Methods

The nickel sheets should be welded by means of electrodes of pure nickel wire without coating or without welding additives.

Therefore, TIG welding, laser welding and electron-beam welding have been used for the experiments. In the case of unannealed sheets, however, laser and electron-beam welding reacted with a disruption of the vapor capillarity to the contents or respectively concentration distributions of hydrogen dissolved in the basic material or incorporated in micropores that are unproblematic for TIG welding.

The sheets used for the rolling experiments were joined by TIG welding. The welding was carried out using a pure nickel electrode with a current of 160 A and 14 V.

5. Rolling

Hot rolling for a first thickness adjustment was not required since the sheets were sufficiently thin to be reduced exclusively by cold rolling.

The rolling tests were performed on 200 mm wide sheets, cut from whole cathode sheets, joined without sorting according to thickness, annealed and unannealed sheets. Surface irregularities ("warts") were leveled by one or more reduction stages. The rolled warts, however, do not merge completely with the original material. The merging was achieved by coarse grain annealing. Therefore, the material is annealed under vacuum at 55 to 80% of the melting point. Since no phase transformation of nickel occurs during annealing, it is possible to eliminate the coarse grain only by deformation and subsequent recrystallizing annealing.

Reels at modern cold-rolling mills have a maximum reel tension of about 150 kN. Thus, the tension applied by them in case of a strip width of 1000 mm amounts to 150 N/mm width. The tensile strength of samples with a weld seam was in average of 250 N/mm$^2$. Thus, the nickel strip can be rolled at full reel tension in the mills used for the production as far as the reduction stages serving for an adjustment of the thicknesses are concerned.

Nickel can easily be subjected to cold forming; transformation degrees of up to 90% are possible without intermediate annealing.

The rolling experiments were carried out in a Quarto rolling stand. The stand has a maximal rolling strength of 1.2 MN, a work roll diameter of 135 mm and reel tensions of respectively max. 50 kN. The maximal width of the strip is of 200 mm. The stand is provided with different instruments for determining thicknesses, reel tension and strip rates, as well as with a quickly reacting adjustment device. The thickness profile of the strip is continuously determined at distances of <1 mm with a laser detector capturing strip thicknesses. Control of the stand was developed for rolling of custom rolled blanks. Thanks to the integrated quick and dynamic roll gap control, the thicknesses could be adjusted at rolling rates of up to 30 m/min.

Independently of the proposed methods, the thickest sections of the sheets were most strongly reduced in the rolling process. Thus, sections with different hardnesses were formed in the strip. In order to avoid the formation of coarse grains, the sections of the strip that were rolled between two annealing steps were in total deformed with a minimum degree. The degree of deformation prior to the annealing process also influences the deformability after the annealing process. In the case of nickel, a deformation of at least 20% is required in order to restore the original ductility after the annealing process.

The different grain sizes were approximately equalized by annealing subsequent to the production of a strip of uniform thickness. Further reduction of the strip in combination with intermediate annealing steps subsequently resulted in a largely uniform grain size.

The invention claimed is:

1. A method of making highly pure and substantially inclusion-free metal strips from whole generally rectangular cathode sheets produced by aqueous electrolysis of at least one metal, the method comprising the steps of sequentially:
   sorting the sheets by thickness and ordering them in a row by thickness or, when the sheets are of substantially the same width and length, sorting the sheets by weight and ordering them in a row generally according to weight;
   fusion-welding the sheets together in the row at leading and trailing edges of the sheets;
   feeding the row of fusion-welded sheets through a roll stand and thereby leveling the sheets into a continuous uniform strip.

2. The strip-making method defined in claim 1 wherein the row of sorted fusion-welded sheets is fed through a succession of roll stands with the thicker or heavier sheets leading and a decreasing amount of thickness reduction in each succeeding roll stand.

3. The strip-making method defined in claim 2 wherein in each succeeding pass the reduction amount is in part determined by the hardness of the sheet whose thickness was most reduced.

4. The strip-making method defined in claim 1 wherein the row of sorted fusion-welded sheets is rolled with the thinner or lighter sheets leading and an increasing amount of thickness reduction with each succeeding rolling pass.

5. The strip-making method defined in claim 4 wherein the reduction process starts at a point of thickness to which the remaining thicker strips will be reduced in this rolling pass.

6. The strip-making method defined in claim 1 wherein the row is fed back and forth through a single roll stand in a plurality of passes with a gap size of the roll stand being decreased with each pass.

7. The strip-making method defined in claim 1, further comprising the step of:
   annealing the row after fusion-welding the sheets together and rolling the row.

8. The strip-making method defined in claim 7 wherein the annealing is effected at a temperature and for a duration sufficient to recrystallize those parts of the metal of the sheets in the row that have been rolled.

9. The strip-making method defined in claim 1 wherein the row of fusion-welded sheets is reduced in thickness in the roll stand in a succession of passes in each of which the thickness of the thickest sheet is reduced to that of the second-thickest sheet until all the sheets are of the same thickness.

10. The strip-making method defined in claim 1, further comprising the step of:
    removing material from edges between succeeding sheets after fusion-welding the sheets together but before rolling the row to reduce sudden thickness variations.

11. The strip-making method defined in claim 10 wherein the material is removed by grinding.

12. The strip-making method defined in claim 1, further comprising the step after rolling of:
    transversely subdividing the strip into starter sheets for use as cathode sheets.

13. The strip-making method defined in claim 1 wherein the strip is carbonized to make steel.

14. The strip-making method defined in claim 1, further comprising the step before fusion-welding the sheets of:
    heat-treating the sheets to degas them.

15. The strip-making method defined in claim 1, further comprising the step before fusion-welding the sheets of:
    desulfurizing the sheets.

16. The strip-making method defined in claim 1, further comprising the step before fusion-welding the sheets of:
    recrystallizing the sheets to alter their grain or crystalline structure.

* * * * *